Oct. 16, 1934.  C. G. WAGNER ET AL  1,977,218
STEERING MECHANISM
Filed May 7, 1928  4 Sheets-Sheet 1
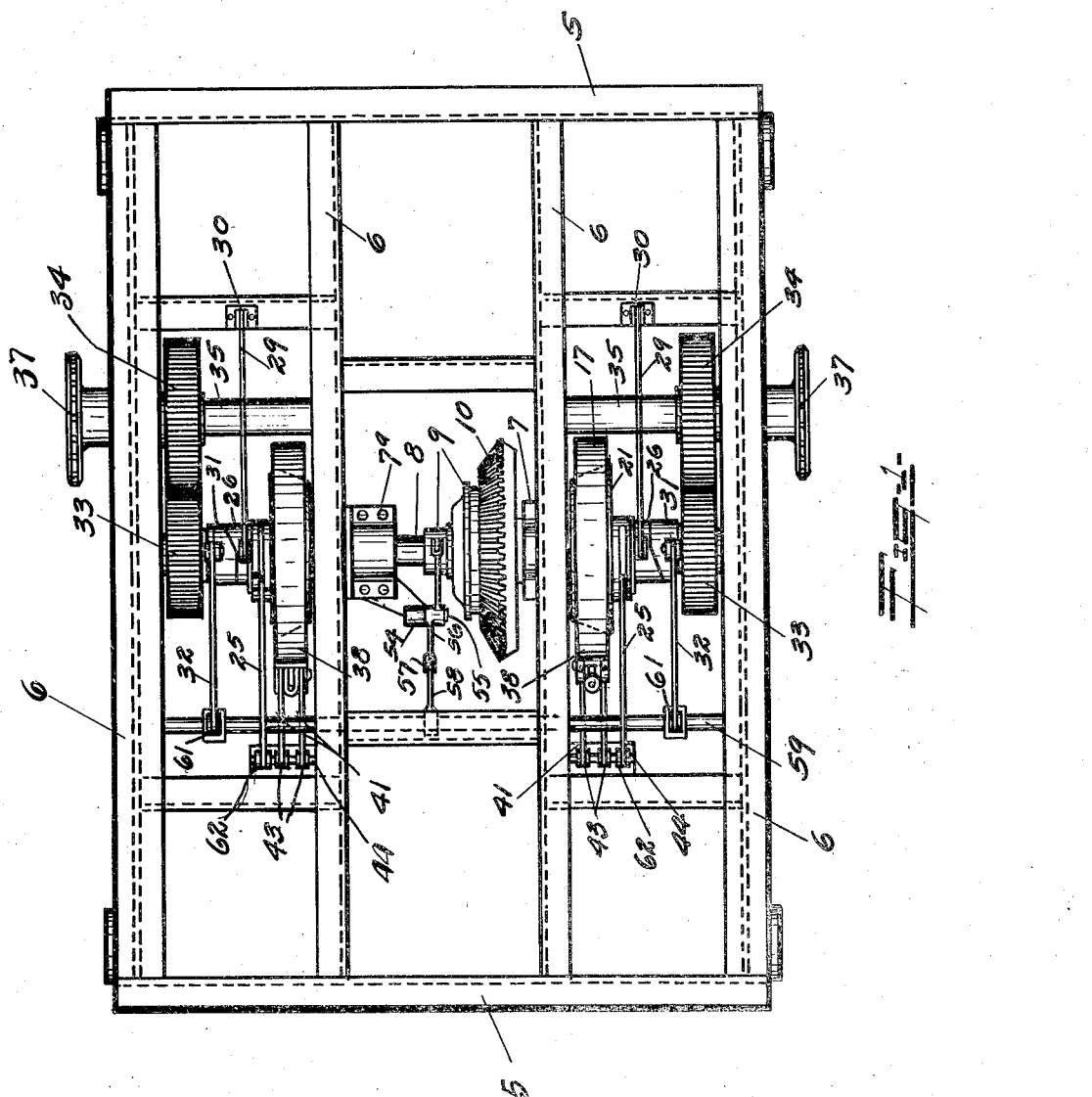
INVENTORS
Carl G. Wagner
John M Kerr
ATTORNEY
Frank C. _____

Oct. 16, 1934.  C. G. WAGNER ET AL  1,977,218
STEERING MECHANISM
Filed May 7, 1928  4 Sheets-Sheet 2
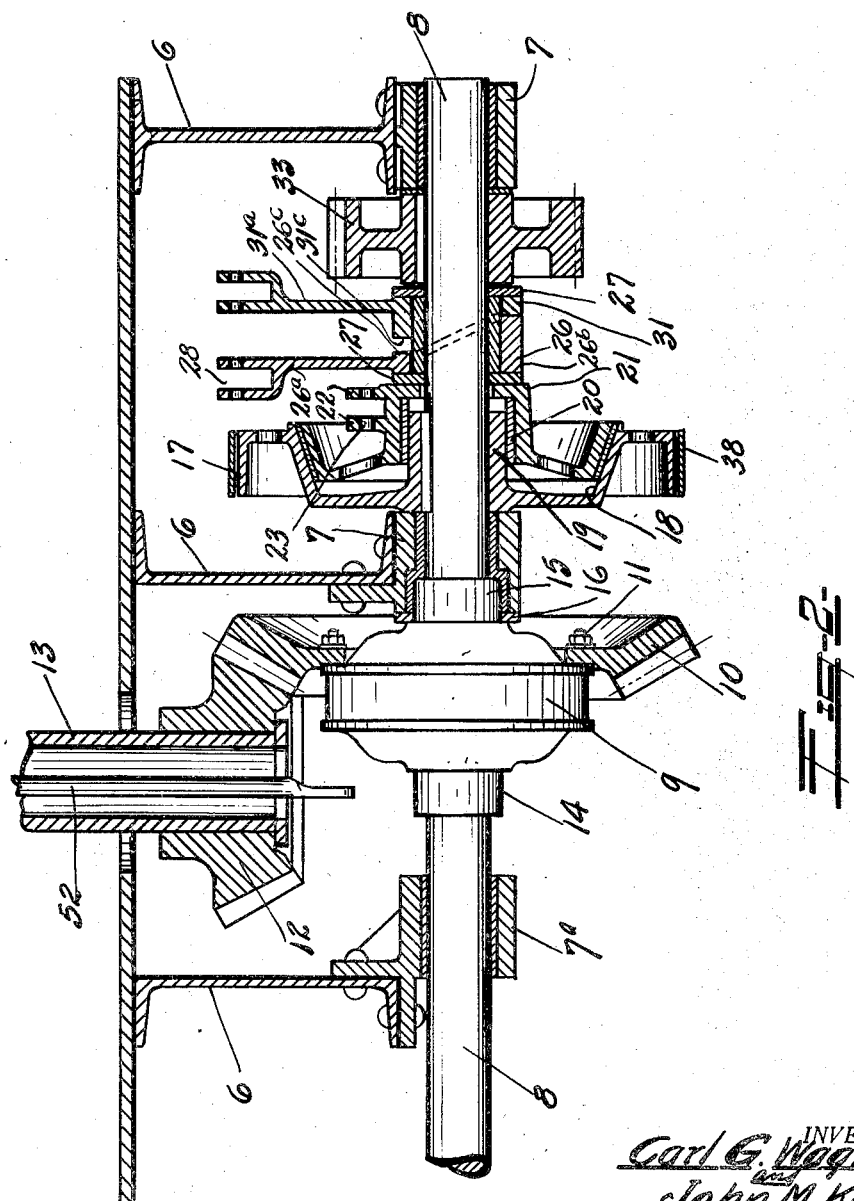
Fig-2-
INVENTORS
Carl G. Wagner
John M. Kerr
By Frank C. Farman
ATTORNEYS.

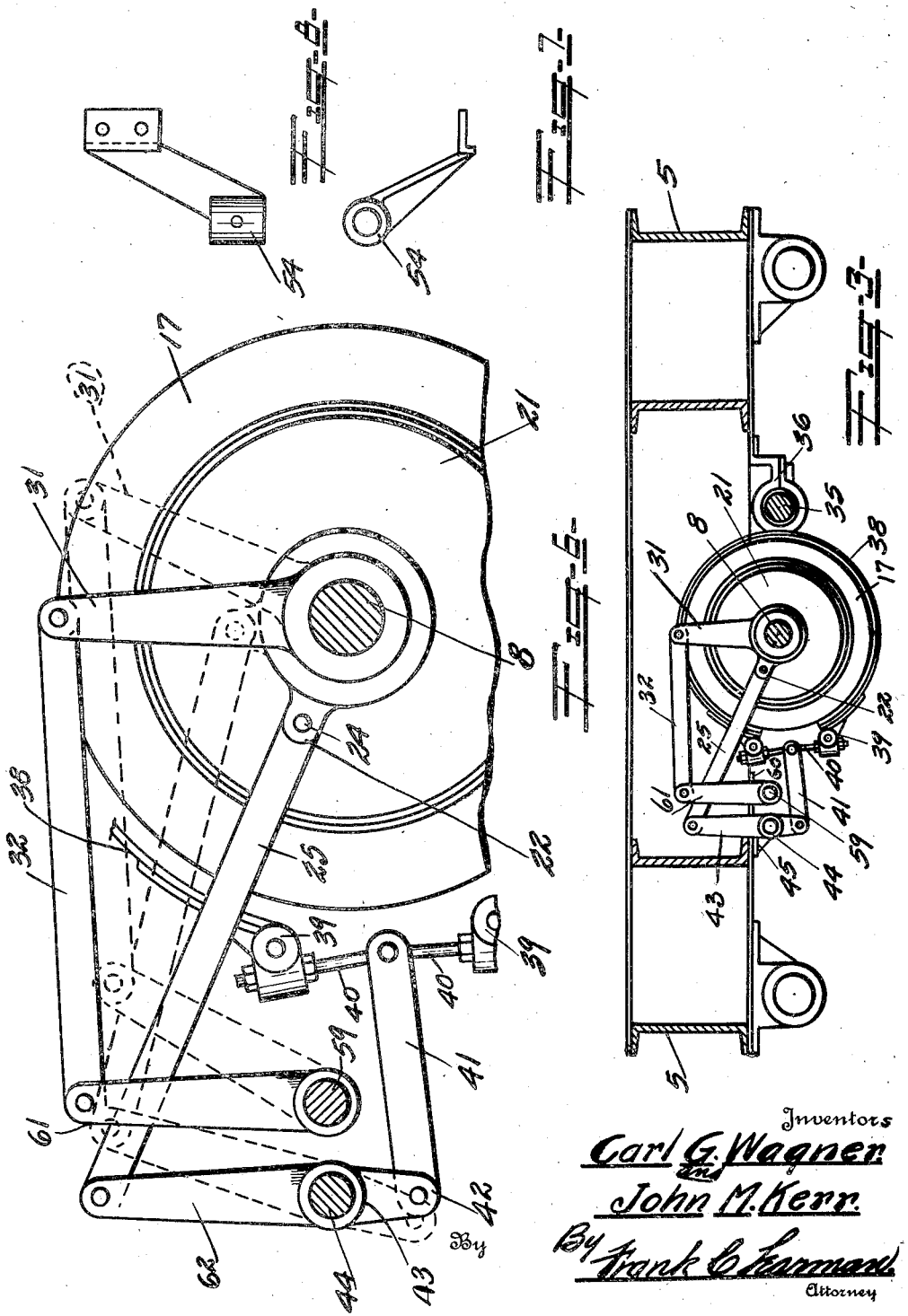

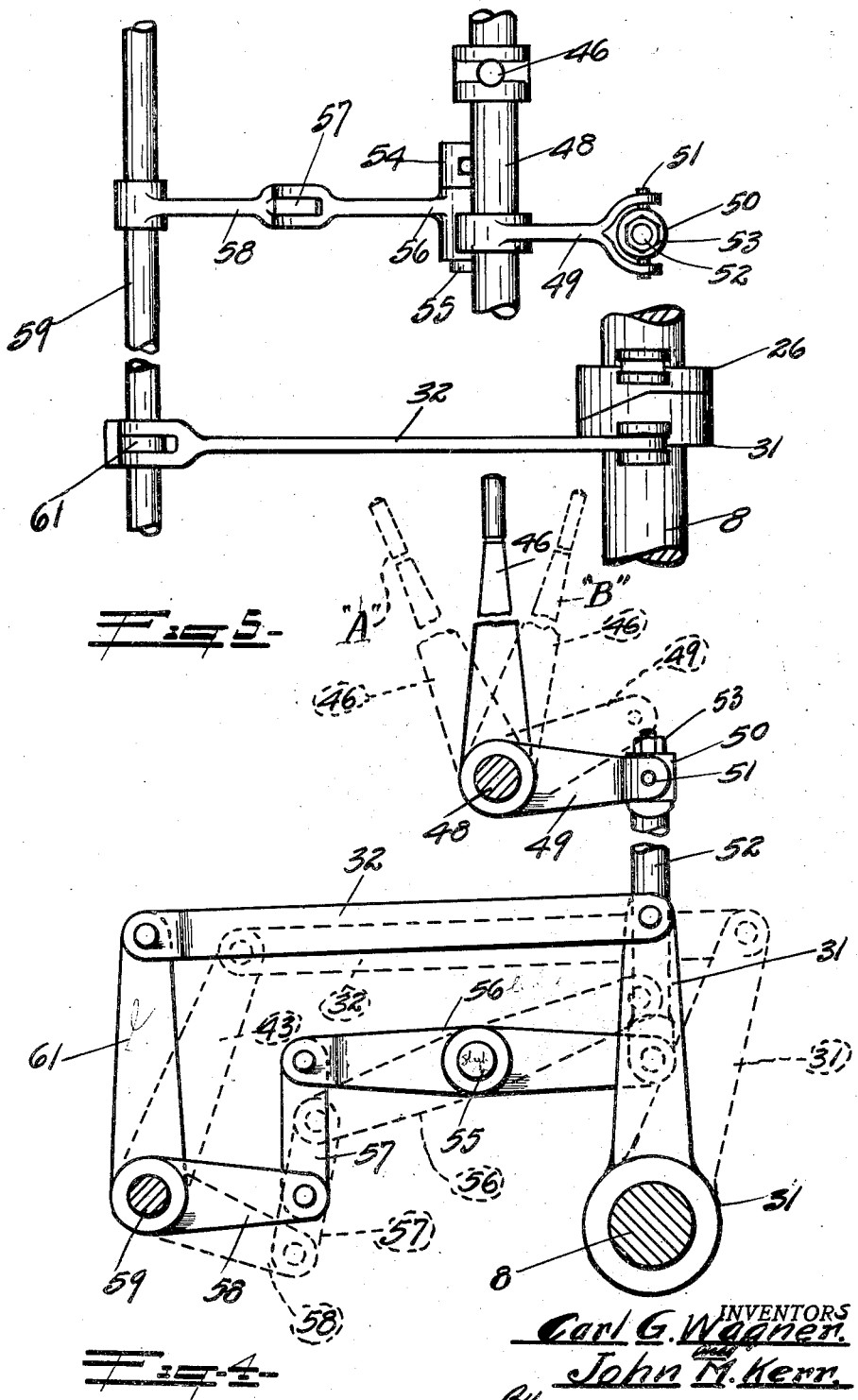

under Oct. 16, 1934

UNITED STATES PATENT OFFICE 1,977,218

STEERING MECHANISM

Carl G. Wagner and John M. Kerr, Bay City, Mich., assignors to Bay City Dredge Works, Bay City, Mich., a corporation of Michigan Application May 7, 1928, Serial No. 275,797

4 Claims. (Cl. 180—17)

This invention relates to full revolving power shovels and the like, and particularly to means for the steering thereof.

One object of the invention is to provide a steering mechanism so designed that the machine can turn in its own length, and make any gradual or sharp turns necessary.

Another object of the invention is to design a simple and smooth operating steering mechanism, which can be easily steered while the machine is under full speed, requiring no halt in the operation thereof.

A further object is to design a flexible steering mechanism having a single lever control, which is very easy to manipulate, and which will not jerk and strain the mechanism, thereby insuring minimum breakage and wear on the machine.

A further object still is to provide means for automatically applying a brake on one side of the machine when the companion clutch is shifted into engagement.

The above and other objects will appear as the specification progresses, reference being had to the accompanying drawings in which we have shown the preferred embodiment of our invention, and in which like reference numerals indicate like parts throughout the several views thereof.

In the drawings—

Fig. 1 is a top plan view of a tractor shovel frame showing our improved steering mechanism mounted thereon, with the control shaft, lever and vertical shaft omitted.

Fig. 2 is an enlarged fragmentary sectional view showing the drive shaft and steering mechanism on one side only of the differential.

Fig. 3 is a sectional end view showing the brake and brake actuating levers.

Fig. 4 is a detail side view showing the arrangement of the control levers, the solid lines showing them in neutral position, the dotted lines showing the position when turning in one direction.

Fig. 5 is a top plan view of the mechanism shown in Fig. 4.

Fig. 6 is an enlarged side view of the brake control means, the full lines showing neutral position, the dotted lines showing the brake applied.

Fig. 7 is a detail end view of the bracket and bearing in which a stud shaft is mounted.

Fig. 8 is a top plan view thereof.

In heavy excavating machines such as tractor shovels, power shovels, ditchers, cranes and similar heavy equipment, it is of course necessary that adequate steering means be provided in order that the machine may move and turn with the progress of the work on which it is engaged. In practice the use of jaw clutches, locks and similar means usually transmits heavy shocks and jars, causing strains and breakage, due to the weight and size, or the machine must be halted to permit shifting the steering mechanism, and we have therefore perfected a simple, substantial "finger touch control", whereby the steering of the machine is accomplished while the machine is under full speed, and without shock or strain thereto.

Referring now particularly to the drawings in which we have shown the preferred embodiment of our invention, the numeral 5 indicates the end frame members of the machine, made up of channel sections or the like, and connected together by means of spaced apart longitudinally disposed beams 6 in the usual manner. Split bearings 7 are securely mounted on said longitudinally disposed beams 6, and a transversely disposed two piece drive shaft 8 is journaled therein, the inner ends of said shaft being journaled in a differential 9 in the usual manner, and it is not deemed necessary to show or describe this differential in detail, as it is identical with the differentials used on automotive vehicles at present in general use.

A bevel gear 10 is secured to this differential by means of bolts 11 or the like, and is driven by means of a bevel gear 12 which is mounted on a vertically disposed hollow shaft 13 (see Fig. 4), said shaft being in turn connected to a source of power, such as the engine which operates the excavating mechanism (not shown). Hubs 14 and 15 are provided on opposite sides of the differential, the hub 15 being journaled in the split bearing 7 as clearly shown in Fig. 2 of the drawings, a thrust collar 16 being mounted on said hub and is interposed between the end of the bearing and the wall of the differential.

A combination brake and friction clutch assembly is mounted on the drive shaft on opposite sides of the differential, each assembly including a brake drum, brake, and friction clutch, the brake drum 17 being keyed on the drive shaft 8 directly adjacent the bearing 7, the web of said drum being shaped to form an internal angled friction surface 18, and an elongated hub 19, and on which a sleeve 20 is slidably mounted.

A male clutch member 21 is mounted on the hub 19, the face of said male clutch being adapted to engage the angled face of the friction surface 18, said male clutch 21 being formed with spaced apart ears 22 in which an opening 23 is provided for the accommodation of a pin 24 and for the attachment of the link member 25.

A two part wedge shifter assembly is mounted on the shaft 8 adjacent each clutch member, the part 26 being formed with an arm 26a and a hub 26b, the one face of the hub being cam shaped as shown at 26c, and a thrust collar 27 is interposed between said clutch and the shifter member 26. The upper end of the arm of the wedge shifter part 26 is bifurcated as shown at 28, and one end of a link 29 is adapted to be pivotally connected thereto, the opposite end of said link being anchored to the frame at the point 30 so that this part 26 is held against rotation.

The coacting shifter part 31 is formed exactly the same as is the part 26, and has an arm 31a cast integral therewith, the hub being mounted on the drive shaft 8 directly adjacent the shifter 26, the cam shaped faces 26c and 31c of these parts 26 and 31 being placed in facial contact, and when the clutch 21 is in disengaged position, the cam shaped faces nest one against the other, as clearly shown in Fig. 1 of the drawings, so that the entire drive shaft will rotate as a unit, but when the arm 31a is swung, the cam face 26c will be forced away from the cam face 31c of the shifter part 31, shifting the part 26 longitudinally on the shaft, and the friction clutch 21 into frictional engagement with the drum surface 18 as clearly shown in Fig. 2 of the drawings, this applies the brake on the shaft section on the one side of the differential, holding said shaft section stationary while the opposite shaft section is free to rotate. A thrust collar 27 is also interposed between the hub of the shifter part 21 and the hub of the gear 33. A link 32 is connected to this arm 31a, and the opposite end of the link is connected to an actuating means to be presently described.

Power is transmitted to the ground engaging means such as crawlers (not shown), by means of gears 33 and 34 respectively provided on each side of the machine, the gears 33 being keyed on the ends of the shaft 8, and the gears 34 are keyed on the transversely disposed shafts 35 which are journaled in bearings 36 secured to the frame members 6, one end of each shaft 35 projecting beyond the frame, and a sprocket 37 is keyed thereon for transmitting power to the crawlers or other ground engaging means.

A brake band 38 surrounds each brake drum 17, and lugs 39 are provided on the ends thereof and to which the adjusting bolts 40 are secured, the inner ends of said bolts being pivotally secured to one end of a pair of links 41, the opposite ends of said links being connected to the depending legs 42 of a pair of cranks 43, said cranks being keyed on a stud shaft 44 which is mounted in bearings 45 secured to the members 6, a similar shaft and crank assembly being provided on the opposite end of the machine and are connected to the opposite brake band in the same manner.

A transversely disposed control shaft 48 is journaled in suitable bearings provided on the top of the frame, and a control lever 46 is mounted on said shaft. A lever 49 is also keyed on said shaft 48 and is formed with a yoke at the one end thereof, said yoke being adapted to be pivotally connected to a trunnion 50, by means of the laterally projecting pins 51 which are formed integral therewith. The trunnion 50 is mounted on the vertically disposed shaft 52, the end of which is shouldered and threaded to receive a nut 53 as usual.

A bearing 54 is secured to and projects at an angle from the bearing 7a, and a relatively short shaft 55 is mounted therein, a compound lever 56 being mounted on said shaft, one arm of said lever being pivotally connected to the lower end of the vertically disposed shaft 52, the opposite arm being pivotally connected to a link 57, which link is in turn connected to a lever 58 which is keyed on the transversely disposed shaft 59, said shaft being journaled in bearings 60 secured to the underside of the frame.

A lever 61 is mounted on the transversely disposed shaft 59 in the position as shown, and one end of the link 32 is pivotally connected to the end thereof, the opposite end of said link being connected to the bifurcated end 31a of the wedge shifter 31 as above described.

A lever 62 is securely mounted on the stud shaft 44 directly adjacent the cranks 43, the link 25 being connected to said lever, the opposite end being connected to the ears 22 of the male clutch member 21, so that as the control lever 46 is swung to the left as indicated at "A" in dotted lines in Fig. 4 of the drawings, the vertical shaft 52, which is connected to one arm of the compound lever 56, will rock the shaft 55, and will transmit motion to the transversely disposed shaft 59 through instrumentality of the crank 58 which is in turn connected to the opposite arm of the compound lever 56 by means of the link 57, and it will be obvious that when the control lever 46 is actuated, that motion will be imparted to the transversely disposed shaft 59 and the lever 61, and as this lever is connected to the arm of the wedge shifter, it will be clear that this shifter will move the clutch into engagement with the brake drum 17 which is keyed on the driven shaft 8, the shifter on the opposite side of the machine being set so that rotation in the direction as above described does not force the clutch on that side of the machine into engagement; consequently, the member 21 on one side of the machine will have a limited rotation (being carried around by the brake drum 17) before it becomes firmly engaged with the friction surface 18 of the drum.

The rotative motion of the male clutch member 21 is transmitted to the stud shaft 44 on which the lever 62 is mounted by means of the link 25, and this swings the crank legs 42 outwardly as clearly shown in dotted lines in Fig. 6 of the drawings, and as the links 41 connect the crank legs 42 to the ends of the brake band 38, it will be clear that the brake band 38 will be set accordingly, preventing rotation of the drive shaft section on the one side of the differential, the opposite drive shaft section being free to rotate in exactly the same manner as an automotive vehicle rear axle so that the machine may turn in the desired direction.

An identically similar brake and friction clutch assembly, together with the wedge shifters is provided on the drive shaft on each side of the differential, the only difference being in the setting of the wedge shifter parts, and these are set so that one shifter unit operates only when the control lever is swung in a predetermined direction, the shifter unit on the opposite side of the differential operating only when the control lever is swung in the reverse direction. These shifters are of conventional design, and are common in heavy machines of the type herein described.

In Fig. 4 of the drawings we have shown the control lever 46 in two dotted line positions, and when the lever is swung to position "A", the various cranks and levers will move to position as indicated in dotted lines in Fig. 4, setting the brake to hold the one section of the drive shaft 8 against rotation, while the other section is driven to permit the machine to turn in one direction, but when the control lever is swung to position "B", and as indicated by the broken lines in the same figure, it will be readily understood that the cranks and levers will move in a reverse direction to apply the brake on the opposite side of the differential and to hold the opposite drive shaft section stationary so that the machine may be turned in the opposite direction, and when the control lever is in neutral position as indicated by the solid lines, the machine may freely move forward or in a reverse direction.

We also wish to direct attention to the fact that the shaft, crank, and lever assembly 43, 44, and 62 are identically similar separate units, one being provided on each side of the machine.

This arrangement is very simple and flexible, can be operated at all speeds, and is in every sense a "finger touch control", as the actuation of the control lever merely shifts the male clutch member into engagement with the drum, the actual application of the brakes being by power.

From the foregoing description it will be obvious that we have perfected a very simple, economical, easy, and smooth operating steering mechanism.

What we claim is:

1. A steering mechanism for power shovels comprising a two piece drive shaft having a differential mounted on the abutting ends thereof, a gear secured on said differential, and adapted to be driven from the power plant of the power shovel, a combination brake and friction clutch assembly mounted on said shaft on each side of said differential, a friction surface on the brake drum, shiftable means adjacent the clutch for shifting said clutch into engagement with the friction surface of the brake drum of the brake assembly, a transversely disposed shaft adjacent the drive shaft, a lever mounted thereon, a link connecting the clutch with said lever, a stud shaft adjacent the transversely disposed shaft, a lever and spaced apart cranks respectively mounted on said stud shaft, a link connecting the clutch with the lever on the stud shaft, and additional links for connecting the spaced apart cranks with the brake for utilizing the rotative movement of the clutch to apply said brake as the clutch is rotated.

2. A power shovel steering mechanism comprising a frame, a drive shaft journaled thereon and having a differential interposed intermediate its length, a gear secured on said differential and adapted to be driven from the power plant of the power shovel, a combination brake and friction clutch assembly mounted on said shaft on each side of the differential, a friction surface on the brake drum, shiftable means adjacent said brake and clutch assembly, a transversely disposed shaft, a lever mounted thereon, a link connecting said lever with said shiftable means for shifting said clutch into engagement with the friction surface of the brake drum of the brake and clutch assembly when the shaft is rotated, a manually operated control shaft for rotating said transversely disposed shaft, a stud shaft adjacent the transversely disposed shaft, a lever and spaced apart cranks respectively mounted on said stud shaft, a link connecting said clutch with said stud shaft lever, and links connecting said spaced apart cranks with the brake assembly for utilizing the rotative movement of the clutch to apply said brake when the clutch is shifted into engagement with the friction surface of the brake drum assembly.

3. In a machine of the class described, and including a drive shaft, having a differential interposed intermediate its length, a gear secured on said differential and adapted to be driven from the power plant of the machine, an individual brake and friction clutch assembly mounted on the drive shaft on opposite sides of the differential, shiftable means mounted on the drive shaft adjacent said brake and friction clutch assembly, a transversely disposed shaft adjacent the drive shaft, linkage connecting said transversely disposed shaft with said shiftable means for shifting the clutch into engagement with the brake drum of the brake and friction clutch assembly, a stud shaft adjacent the brake assembly, a lever and spaced apart cranks respectively mounted thereon, a link connecting said clutch and stud shaft lever, and additional links connecting said spaced apart cranks with the brake assembly for applying the brake when the clutch is shifted into engagement with the brake drum.

4. A power shovel of the class described, and comprising a drive shaft having a differential interposed intermediate its length, a gear secured on said differential and adapted to be driven from the power plant of the power shovel, a combination brake and friction clutch assembly mounted on said drive shaft and on opposite sides of the differential, a friction surface on the brake drum, a two part wedge shifter adjacent each clutch assembly, one part being anchored to the power shovel, a transversely disposed shaft, levers mounted thereon, links connected to said levers and to one of said wedge shifter parts for selectively shifting said clutch into engagement with the friction surface of the brake drum when the transversely disposed shaft is rotated in a predetermined direction, a stud shaft adjacent said transversely disposed shaft, levers and cranks respectively mounted thereon, a link connecting said clutch with a lever on the stud shaft, additional links connecting said cranks on the stud shaft with the brake assembly for applying the brake when the clutch is being shifted into engagement with the friction surface on the brake drum, and a control lever for selectively rocking the transversely disposed shaft in either direction to apply the brake on one side of the differential without effecting the brake on the opposite side.

CARL G. WAGNER.
JOHN M. KERR.